United States Patent

[11] 3,609,716

[72] Inventors Seihin Kobayashi;
Michihiro Torii, both of Shizuoka Prefecture, Japan

[21] Appl. No. 761,246
[22] Filed Sept. 20, 1968
[45] Patented Sept. 28, 1971
[73] Assignee Fuji Electrochemical Co., Ltd. Tokyo, Japan
[32] Priority Dec. 6, 1967
[33] Japan
[31] 42/77935

[54] MEMORY DEVICE
5 Claims, 8 Drawing Figs.

[52] U.S. Cl. .......... 340/174 M, 340/174 CR, 340/174 LA, 340/174 PD, 340/174 DC, 340/174 NC
[51] Int. Cl. .......... G11c 5/02, G11c 11/06
[50] Field of Search .......... 340/174 M; 29/604

[56] References Cited
UNITED STATES PATENTS

| | | | |
|---|---|---|---|
| 3,325,791 | 6/1967 | Italia | 340/174 |
| 3,427,711 | 2/1969 | Baillargeon | 29/604 |
| 3,317,408 | 5/1967 | Barnes et al. | 204/15 |

*Primary Examiner*—James W. Moffitt
*Attorney*—Birch, Swindler, McKie & Beckett

ABSTRACT: A memory device operable according to a three-dimensional current coincidence mode having N-bit matrices arranged in the X direction as a two-dimensional matrix, in which each bit matrix comprises memory elements arranged in a mat form so that there are P memory elements in the X direction and M/P memory elements in the Y direction, where M and N are the number of words and the number of bits of each work, respectively, and P is a value determined by the relation $M/P \cong N/P \cong \sqrt{MN}$, i.e., $P$ is an integer as equal as possible to $\sqrt{M/N}$ and each memory element is strung with an X-winding, a Y-winding, an inhibit winding and a sense winding or a combined inhibit and sense winding, that is, a memory device operable in the three-dimensional current coincidence mode (electrically) with its memory matrix of two-dimensional arrangement (physically).

MEMORY DEVICE

This invention relates to memory devices and more particularly to a magnetic core memory for the electronic computer.

It is a primary object of the present invention to provide a magnetic core memory of the type operable in accordance with the three-dimensional current coincidence mode comprising N-bit matrices arranged with two-dimensional mode physically, each of said bit matrices being formed by arranging a number of memory elements in matrix form so that there are *P* memory elements in the *X* direction and *M* /*P* memory elements in the *y* direction, where *m* and *n* are the number of words and the number of bits forming each word, respectively, and *p* is a value determined by the relation $m/p \cong NP \cong \sqrt{MN}$, i.e., *p* is approximately equal to the $\sqrt{MN}$ and *p* is a measure of *m*, each of said memory elements being strung with an X-winding, a Y-winding, an inhibit winding and a sense winding so that it can be driven in accordance with the three-dimensional current coincidence mode of the readout and write-in of the information.

The above and other objects, advantages and features of the present invention will be apparent from the following description taken with reference to the accompanying drawings, in which.

Conventional magnetic core memories comprise a magnetic memory plane in which a number of memory elements are arranged in the form of a mat and each is strung with associated windings so as to define a particular position called the address. The memory device of this kind is generally classified into two types depending on the mode of its operation, that is, a memory device of the type adapted to operate in accordance with the three-dimensional current coincidence mode or 3-D mode, and a memory device of the type adapted to operate in accordance with the word arrangement mode or 2-D mode.

Figure 1:
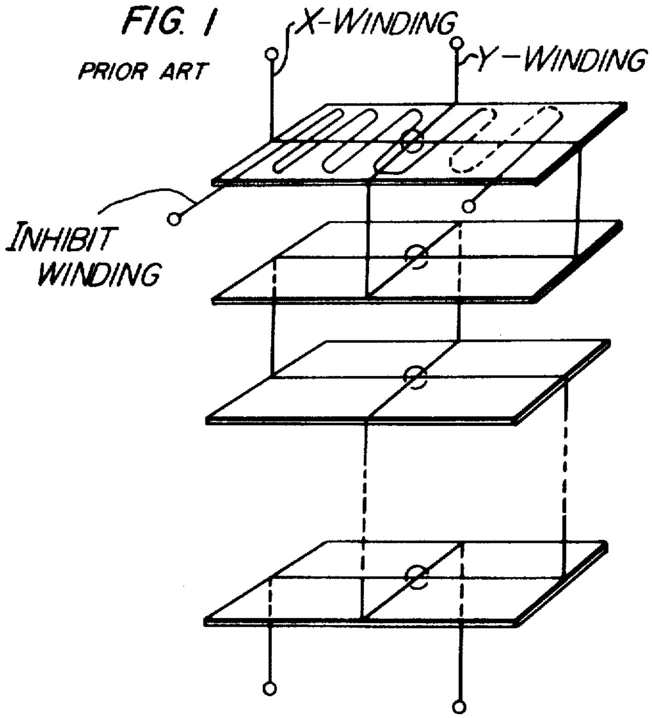
FIG. 1 PRIOR ART
FIG. 1 is a diagrammatic perspective view of a conventional magnetic core memory adapted to operate with the three-dimensional current coincidence mode.

The conventional memory device of the former type which is operable in accordance with 3-D mode has a structure as shown in FIG. 1, from which it will be understood that a bit plane is formed by arranging memory elements of a number corresponding to the number of words or characters to be stored, and these bit planes are stacked in tiers of a number corresponding to the number of bits forming each word or character. It is well known that a memory device of this type has the advantage that the number of outlet lead wires and surrounding circuits can be quite reduced.

Figure 2:
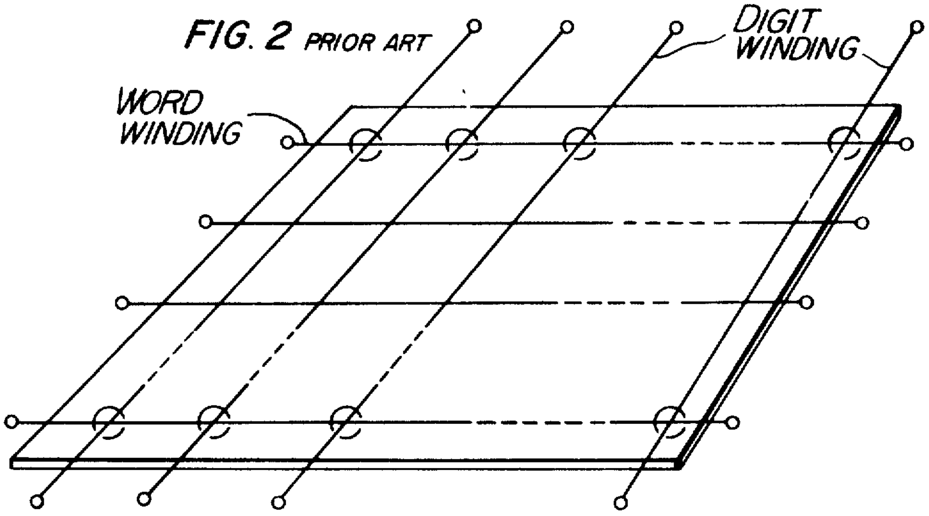
FIG. 2 PRIOR ART
FIG. 2 is a diagrammatic perspective view of a conventional magnetic core memory adapted to operate with word arrangement mode.

The conventional device of the latter type which is operable in accordance with the 2-D system has a structure as shown in FIG. 2, from which it will be understood that memory elements of a number corresponding to the number of required bits are arranged in parallel in the X direction to form a memory plane carrying individual words, and these memory planes are arranged in the Y direction of a number corresponding to the number of words to be stored. It is well known that the memory device of this type has the advantage that a high-speed operation can be effected while its capacity is relatively small.

However, an attempt to obtain a large-capacity and high-speed memory device which is operable in accordance with the three-dimensional current coincidence mode results in the defect that the line length of the drive windings becomes excessively long to such an extent that a time delay in the drive current passage through the drive windings becomes so large that it is no longer negligible and further driving such windings by a transistor becomes difficult because the drive windings have an excessively large inductance.

On the other hand, a similar attempt to obtain a large-capacity high speed memory device which is operable in accordance with the word arrangement mode results in the defect that the number of the word windings becomes quite large and the structure of the memory device becomes extremely complex since the number of surrounding circuits is directly proportional to the memory capacity.

The present invention intends to effect improvement in the conventional memory device of the kind operable in accordance with the three-dimensional current coincidence mode and contemplates the provision of a novel and improved memory device in which memory planes as used in the above-described system are arranged in a two-dimensional mode and are adapted to be driven in a manner similar to the way of driving with the three-dimensional current coincidence mode.

Figure 3:
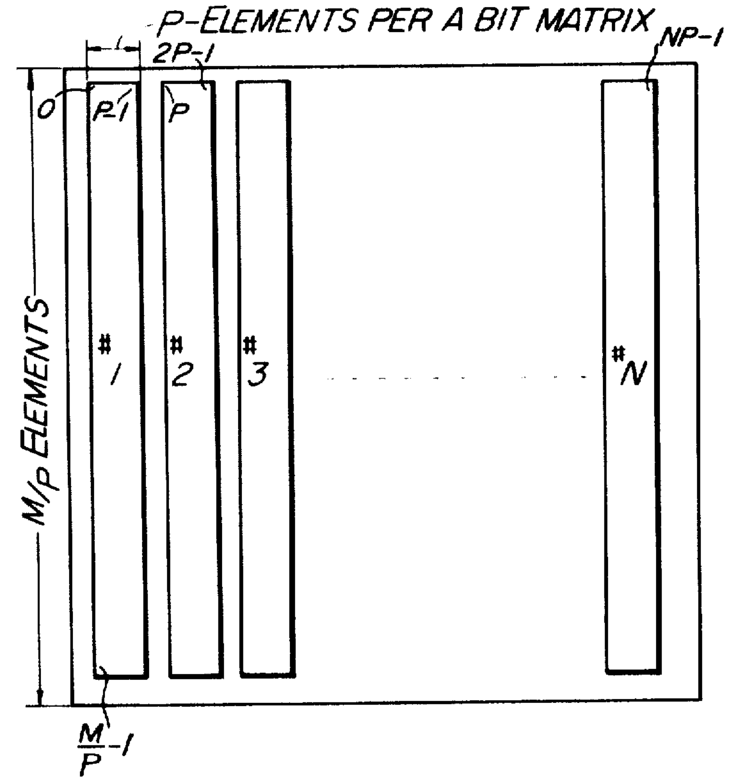
FIG. 3 is a diagrammatic plan view of a memory plane employed in the memory device according to the present invention, the view showing a preferred arrangement of memory cores in the memory plane.
Figure 4:
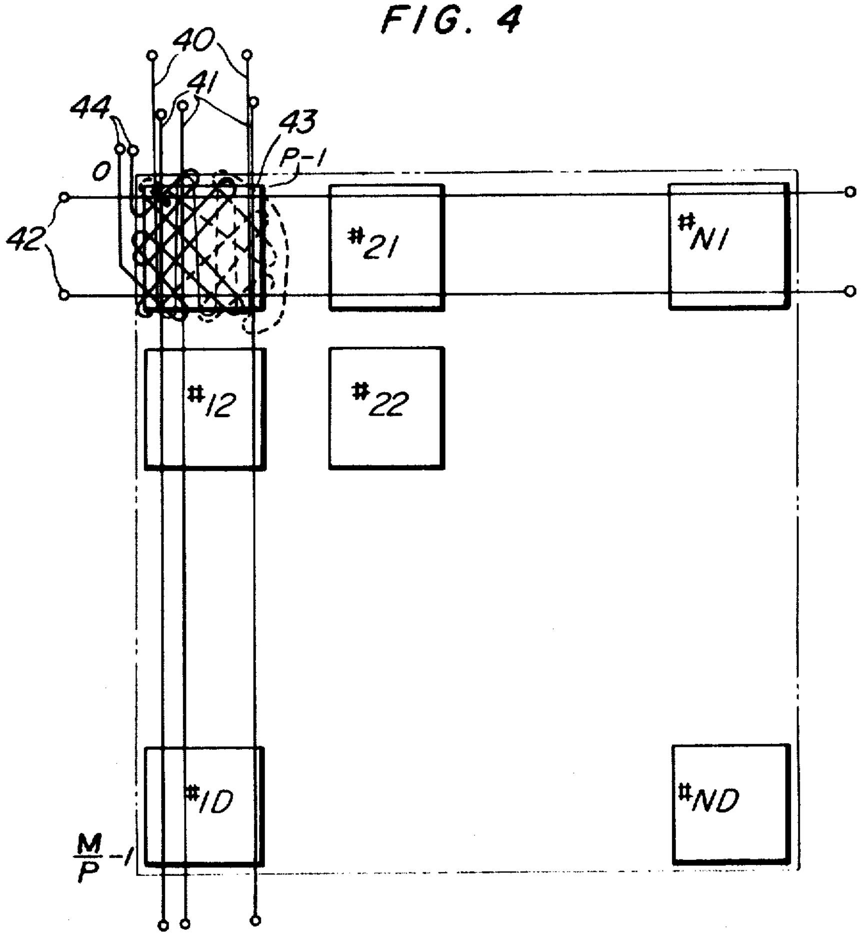
FIG. 4 is an enlarged view of one form of the memory plane of the present invention in which each core matrix is strung with an independent sense winding and inhibit winding.

Referring to FIG. 3, in accordance with the invention, N-bit matrices are arranged in the X direction and within each bit matrix there is a number of bits P also extending in the X direction, P being a positive integer and a measure of M. The number of bits per matrix extending in the Y direction equals M/P. Therefore, for the entire planar memory element there are PN bits extending in the X direction and M/P elements extending in the Y direction for a total of MN bits. In the foregoing arrangement the number of driving wires wound through the X direction will be PN, and the number of driving wires wound in the Y direction will equal M/P for a total number of PN+m/p driving wires for the memory.

It has been found that the number of driving wires is at a minimum when $M/P = PN$. Thus, the number of X AND Y windings is minimized, as is the line length of the drive windings. This results in a reduction in the time delay for propagation through the drive windings to a minimum, and an advantageous reduction in the winding inductance.

In order to achieve the foregoing condition the value of *P* is selected to satisfy the following relationship:

$$M/P \cong Pn \cong \sqrt{MN},$$

whereby *p* is a positive integer and a measure of *M*. The inequality of the foregoing relationship results from the fact that *P* must meet the condition of being an integer and being the measure of *M*. remembering that the most desirable condition is when $M/P=PN$, and because $M/P \times PN=MN$, the result for this condition is that $M/P=PN=\sqrt{MN}$. Thus, it is the latter relationship which produces the most desirable result in terms of economy of construction and optimum electrical characteristics. This relationship, however, can rarely be achieved in view of the fact that *P* must be an integer and cannot be a fraction. The integer will be that which is most nearly equal to $\sqrt{M/N}$. Therefore, the unequal relationship set forth above, results.

An embodiment of the invention exemplary of the foregoing principles is one where $M$=16,384 bits and $N$ =72 bits. Because $\sqrt{M/N}$ will be a fraction in excess of 15, P is selected to be 16. Therefore, each bit matrix has 16 bits in the X direction with 72 bit matrices being arranged in the X direction for a total of 1152 bits (PN) in that direction. There will be 1224 bits (M/p) in the Y direction.

Each bit matrix comprising the P×M/P memory elements may be further divided into D units in the Y direction so that D tiny core matrices are arranged in a side-by-side relation in the Y direction.

It will thus be understood that the memory elements are arranged with the two-dimensional mode physically to form a matrix and the matrix is adapted to be driven in accordance with the three-dimensional current coincidence mode electrically. In this connection, it is to be noted that the inhibit winding and the sense winding for each memory element may be provided independently of each other or may be combined together as a common sense and inhibit winding. Each core matrix may be strung with a single inhibit winding and a single sense winding, or they may be suitable by subdivided and may be so strung that they extend from one core matrix to another.

A device constructed according to the principles of this invention may utilize the method of providing, prior to the provision of the X-winding, both an insulated wire to be used as the X-winding and an insulated wire to be used as the inhibit or sense winding. The latter insulated wires are adhered to each other by a suitable adhesive agent to be made into a single integrated cable. The aforementioned single cable is strung through a row of cores and coupled to core matrices divided into D units in the Y direction. The foregoing method of manufacture serves to reduce the number of man-hours required to produce such a device and to eliminate any inductive noise due to the nonuniformity between the dispositions of the wires discussed above.

The present invention will now be described in detail with reference to FIGS. 4 to 8. In an embodiment shown in FIG. 4, each of the bit planes constituting the P×M/P memory elements is divided in D units in the Y direction to provide D core matrices 43 arranged in side-by-side relation to the Y-direction. Each core matrix 43 is strung with a single inhibit winding 40, a plurality of X-winding 41, a plurality of Y-windings 42, and a sense winding 44. It will be seen that the inhibit winding 40 and the sense winding 44 are disposed independently of each other. This arrangement is especially advantageous for the diagonal stringing of the sense winding 44.

Figure 5:
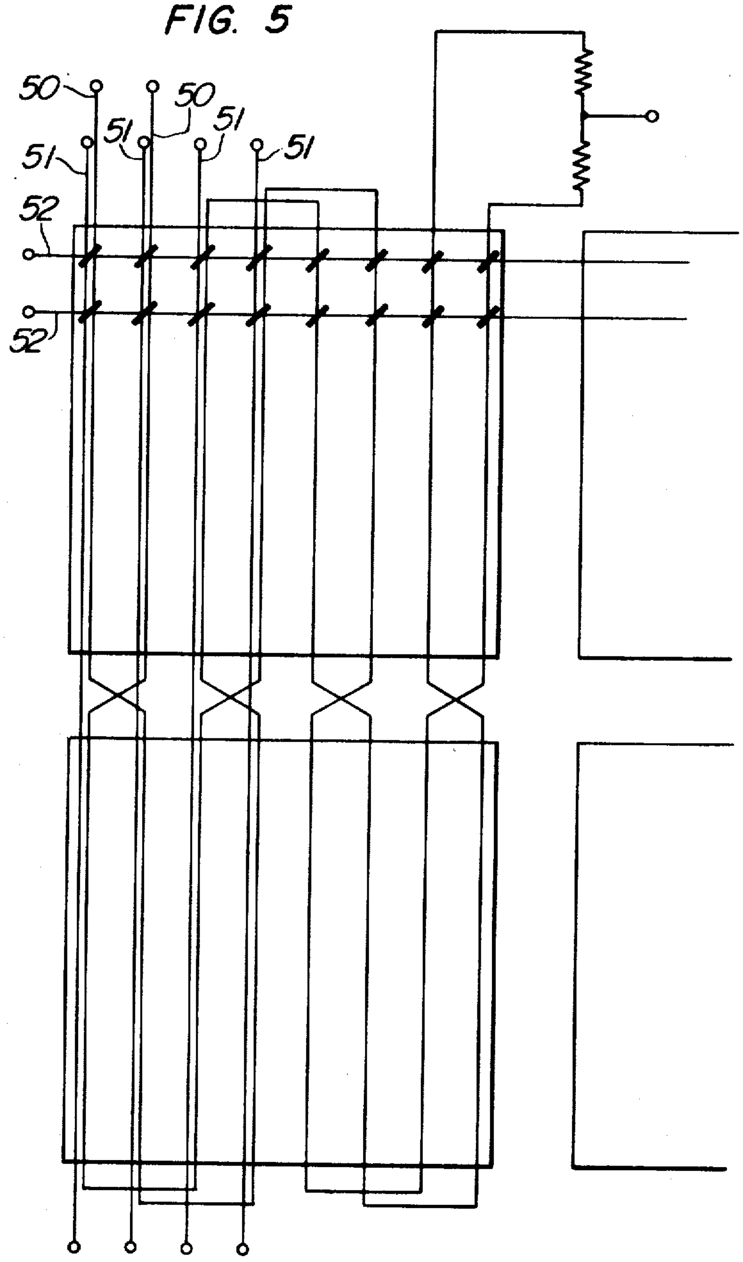
FIG. 5 is an enlarged view of another form of the memory plane of the present invention in which each core matrix is strung with a common inhibit and sense winding.

In another embodiment shown in FIG. 5, each core matrix is strung with a combined sense and inhibit winding 50, a plurality of X-windings 51 and a plurality of Y-windings 52. In this case too, the combined sense and inhibit winding 50 may be suitably into a plurality of windings for stringing with the core matrix.

Figure 6:
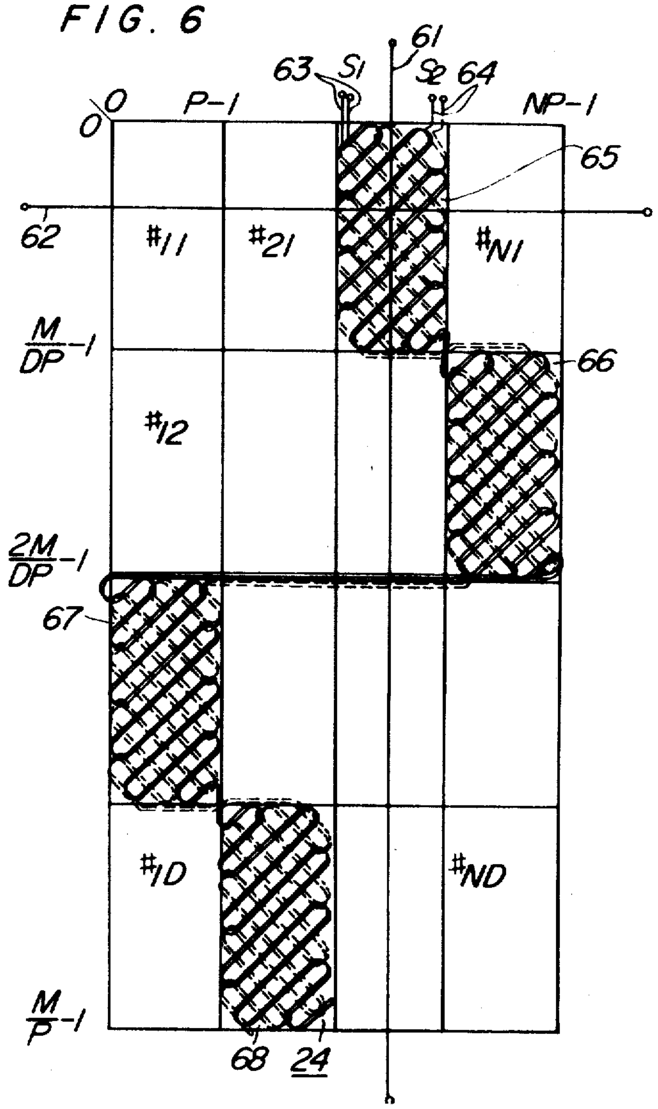
FIG. 6 is an enlarged view of another form of the memory plane of the present invention in which each core matrix is strung with divided sense windings and they extend from one core matrix to another.

In another embodiment shown in FIG. 6, each core matrix is strung wit two pairs of sense winding 63, and they extend from the upper core matrix 65 to another 66, 67 and 68.

Figure 7:
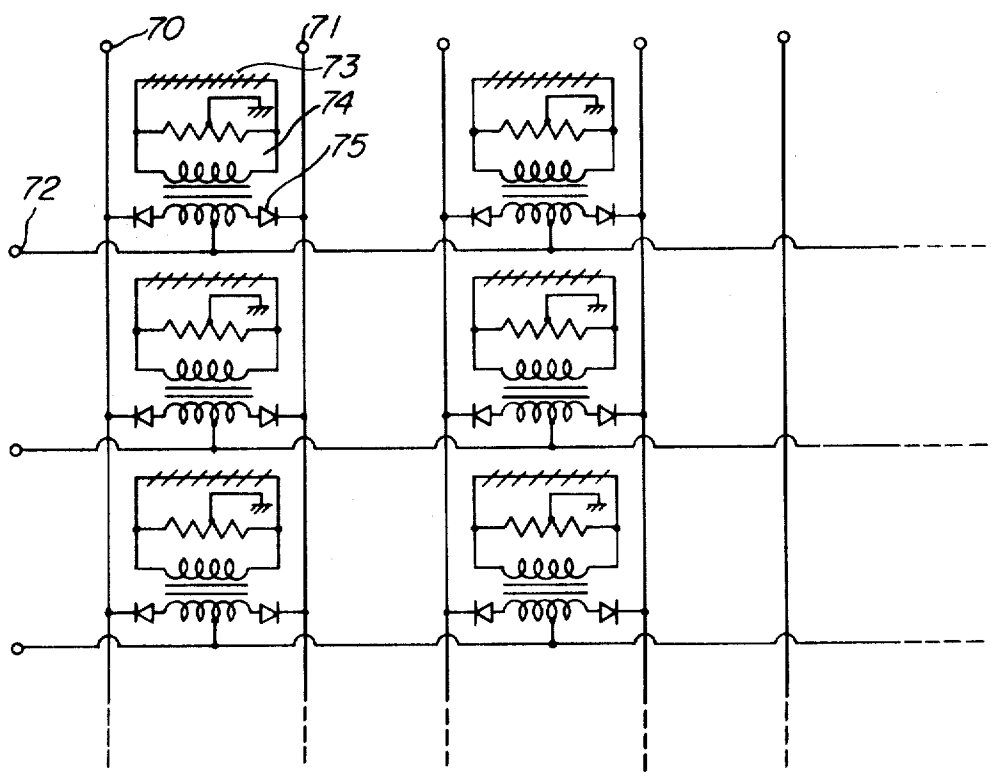
FIG. 7 is a schematic diagram of an exemplified selective driving circuit preferably used with the memory plane according to the present invention.

Referring to FIG. 7, there is shown the structure of an address selection circuit comprising pulse transformers and diodes for driving the memory device of the present invention in accordance with the three-dimensional current coincidence mode. The circuit portion for each memory core 73 includes drive pulse input terminals 70, 71 and 72, a pulse transformer 74 and diodes 75 as shown.

Figure 8:
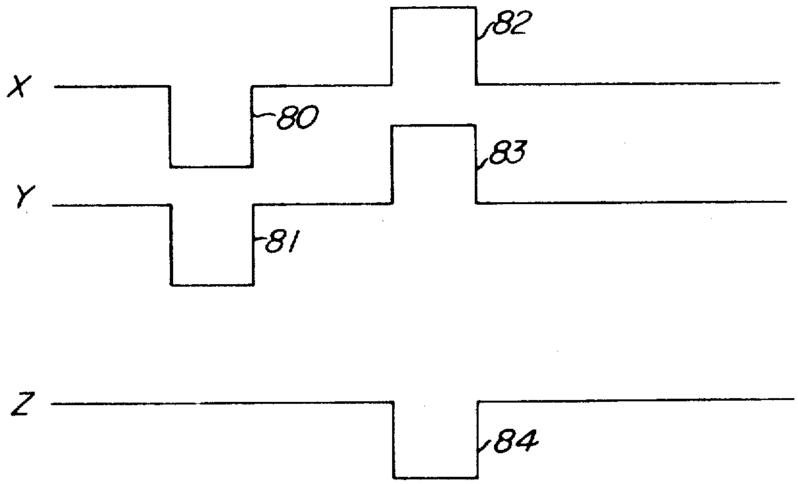
FIG. 8 is a graphic illustration of driving pulse waveforms address selection of the memory plane.

Readout of information is accomplished by application of half-select readout pulses 80 and 81 of waveforms as shown in FIG. 8 to the X- and Y-winding, respectively. For the write-in "1" information, half-select write-in pulses 82 and 83 of waveform as shown in FIG. 8 may be applied to the X- and Y-windings, respectively. On the other hand, the write-in of "0" information can be accomplished by applying the half-select write-in pulses 82 and 83 to the X- and Y-windings and further applying to these drive windings an inhibit pulse 84 whose polarity is opposed to the polarity of the pulses 82 and 83 and which has a current amplitude which is substantially equal to that of the pulses 82 and 83.

What is claimed is:

1. A memory device capable of operating according to the three-dimensional current coincidence mode of operation, while having a two-dimensional arrangement, wherein N corresponds to the maximum number of bits formed in each word and M corresponds to the number of words said device is capable of storing, comprising:
   a number N of bit matrices arranged in a first direction, each of said matrices being coplanar with the others in a side-by-side relationship,
   a plurality of memory elements forming each said bit matrix the number of said elements being equal to the product of the number P of said elements extending in said first direction in said bit matrix and the number of elements extending in a second direction in said bit matrix, the latter being equal to the value of the ratio of M to P, P being a positive integer and of a value such that the ratio of M to P is as nearly equal as possible to the product of N and P which is as nearly equal as possible to the square root of the product of M and N,
   a first plurality of write windings extending through said memory elements in said first direction,
   a second plurality of write windings extending through said memory elements in said second direction, and
   inhibit and sense windings for each of said matrices.

2. A memory device according to claim 1, in which said inhibit winding and sense winding are combined together as a single common winding.

3. A memory device according to claim 1, in which each said bit matrix is further divided in D core matrices in the Y-direction.

4. A memory device according to claim 1, in which the sense winding is splitted into at least two pairs of the subdivisions thereof in the unit core matrix composed of M/D units of memory cores when the diagonal sense winding is employed.

5. The memory device defined in claim 1 wherein said inhibit and sense windings are independent of each other.